Fig. I.

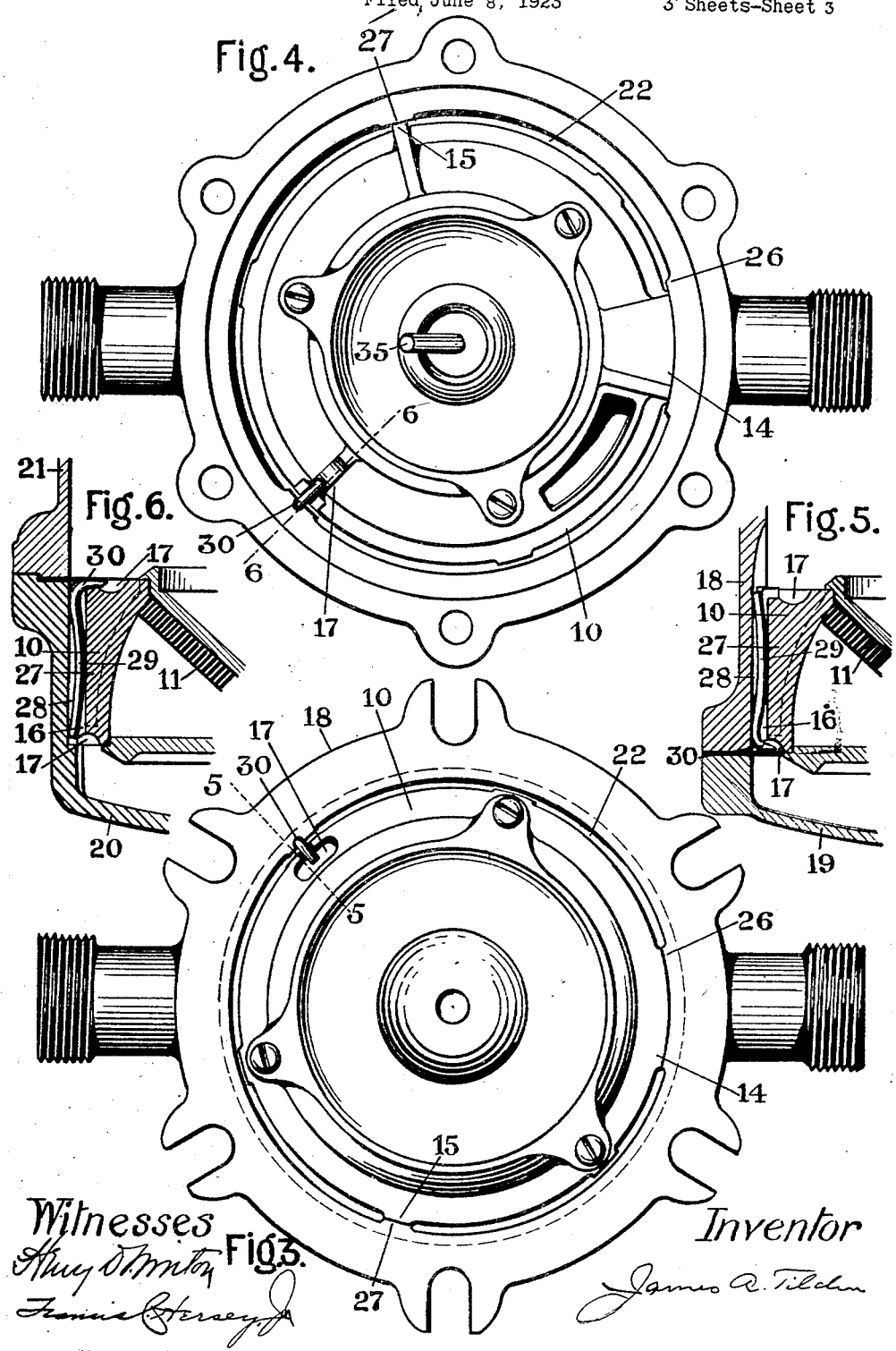

Patented Dec. 29, 1925.

1,567,345

UNITED STATES PATENT OFFICE.

JAMES A. TILDEN, OF BOSTON, MASSACHUSETTS.

METER.

Application filed June 3, 1923. Serial No. 644,270.

*To all whom it may concern:*

Be it known that I, JAMES A. TILDEN, a citizen of the United States, residing at Boston, in the county of Suffolk and State of Massachusetts, have invented a new and useful Meter, of which the following is a specification.

Domestic meters for the measurement of water are generally divided into two classes—those having the bottom section of the outer casing breakable if the contents freeze, to protect against injury to the associated elements which are carried by the upper casing-section inserted in the piping of the water system, and those of the split type, in which the lower section of the casing is joined to the piping, removal of the upper section rendering the mechanism accessible without taking the instrument out of the system. In both classes of meters, there is, within the casing, a separable chamber containing the disk or other measuring device, the casing and chamber having registering ports, about which is a liquid-tight joint to compel the passage of the water to be measured through the chamber. To furnish this joint, it is customary to form exterior and interior tapered walls upon the chamber and casing, respectively, which, by their contact about the ports, prevent leakage. In the breakable-bottom meter, the chamber must be inserted in the casing from below, while in the split-casing meter it enters from above. Such an arrangement is open to serious objections. Since the external taper of the measuring chambers is opposite in the two classes, they are not interchangeable, there being involved the expense of manufacturing and carrying in stock two sets of parts. Moreover, corrosion frequently causes the tapered measuring chamber to stick fast within the casing, so that it is difficult or impossible to remove it without injury. This last defect tends to defeat the advantage of the split-casing meter by rendering it necessary to take the instrument out of the line for repair. It is an object of my invention to obviate these difficulties by providing a construction by which the desired joint is obtained with the same inner chamber applicable to different classes of meters, which chamber is readily separable from the outer casings.

Figure 1:
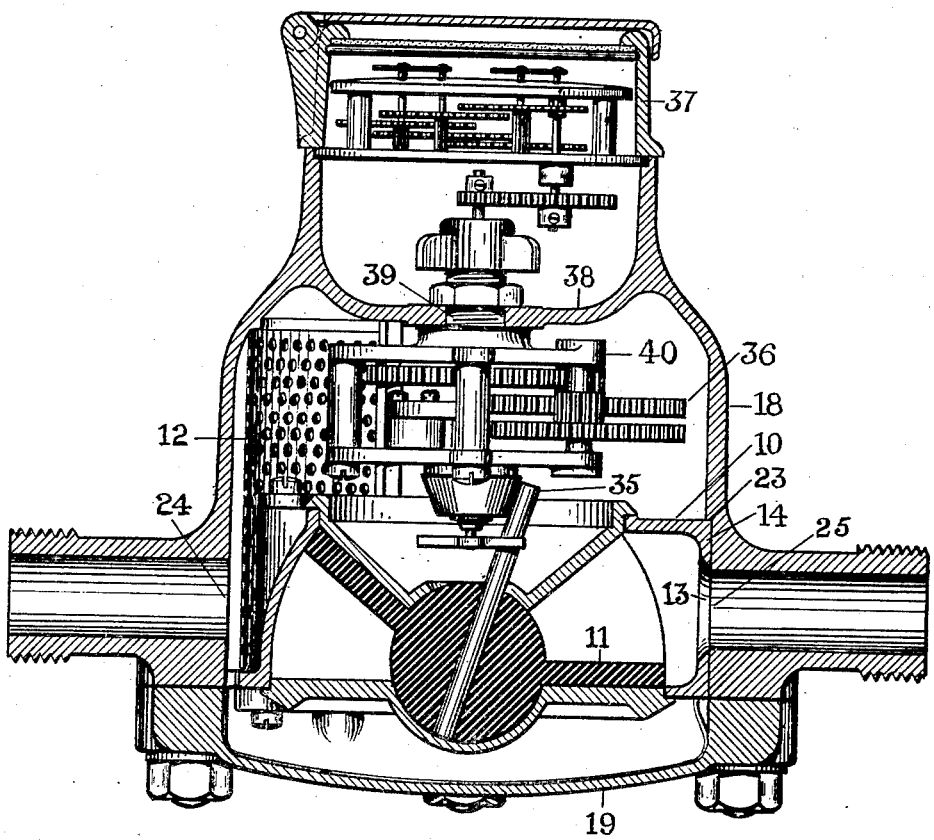
Figure 2:
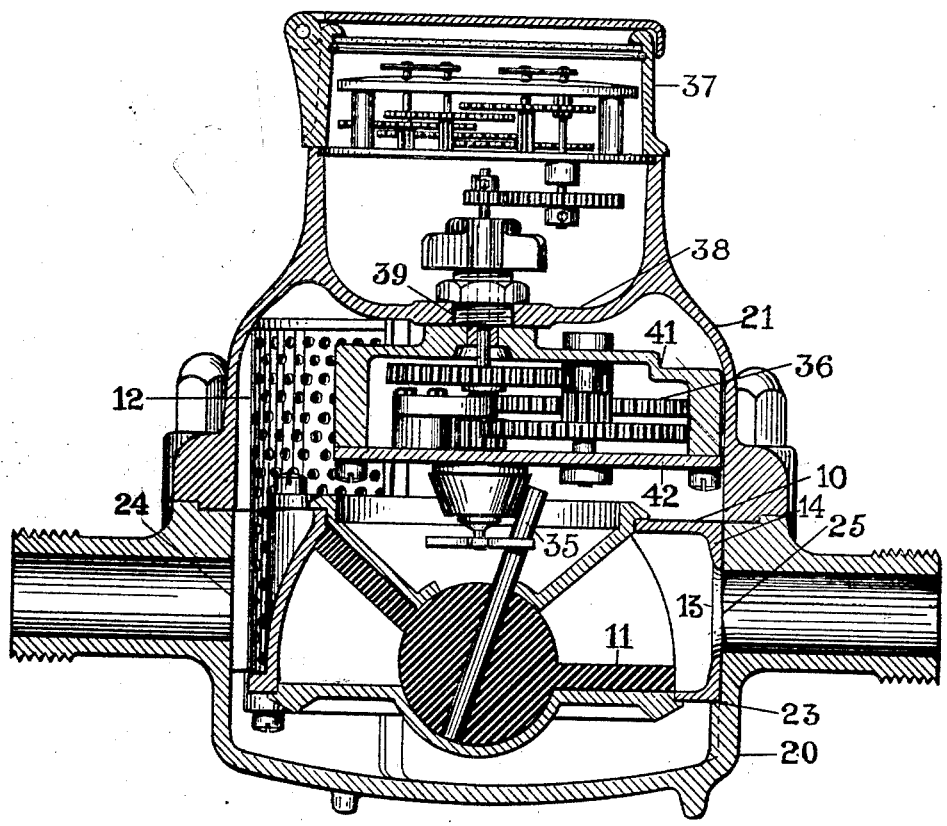

Referring to the accompanying drawings, in which are illustrated particular embodiments of my invention, Fig. 1 is a central vertical section through a breakable-bottom meter; Fig. 2 is a similar view through a meter of the split-casing type; Fig. 3 is a bottom plan view of the upper casing-section of the meter of Fig. 1, with the bottom section removed; Fig. 4 is a top plan view of the bottom casing-section of Fig. 2, with the upper section removed; and Figs. 5 and 6 are, respectively, transverse sectional details on the line 5—5 of Fig. 3 and 6—6 of Fig. 4.

My interchangeable measuring chamber appears at 10, it being of generally cylindrical form and containing a measuring device, here illustrated as a disk 11. This chamber is organized to receive the liquid to be measured through the usual screen 12 and to deliver it through an outlet-port 13. The port opens through a contact-face in the peripheral wall of the chamber, being shown as in an arcuate surface forming a portion of a cylinder and lying under a projection 14 from the chamber. Spaced from the projection 14, substantially by 120 degrees, is shown a second peripheral projection 15, while between these projections, in the chamber wall, is a vertical groove 16, at the opposite extremities of which are depressions 17, 17 in the heads of the chamber.

To receive this measuring chamber, the upper section 18 of the meter of Figs. 1, 3 and 5, having a breakable bottom section 19, and the bottom section 20 of the meter of Figs. 2, 4 and 6, having the top section 21, are similarly arranged. That is, there is in each a generally cylindrical space 22, by which the chamber 10 is received, there being about this space a shoulder 23, against which said chamber is seated. In the wall of the space 22 is an inlet-port 24 opposite the screen 12 of the measuring chamber, and an outlet-port 25 formed in an arcuate surface of an inward projection 26 from the casing, this surface fitting the surface of the chamber-projection 14 to form a liquid-tight joint. A second casing-projection 27 contacts with the chamber-projection 15, and registering with the groove 16 is a corresponding vertical groove 28 in the casing-wall. To force the outlet-ports 13 and 25 into co-operation and maintain the surrounding surfaces and the projections 15 and 27 in the desired contact, there is situated within the grooves 16 and 28 a yieldable member, in the form of a spring-key 29. This key may be of resilient wire, circular in cross-section and bowed inwardly so that its opposite end-portions rest within the groove 28 of the casing, while its center lies in the groove 16 of the measuring chamber. There is such a relation between the co-operating walls of the casing and chamber and the surfaces adjacent to the grooves 16 and 28, that when the key has been removed, there is left a considerable clearance between the two elements, which permits the chamber to be freely introduced into or removed from the casing, and which prevents their binding together by corrosion. The withdrawal of the key may be effected conveniently by the insertion of a screw-driver or other tool into one of the depressions 17 beneath an angular end-portion 30 upon the key, the double depressions in the chamber providing for access to this portion 30 in connection with the use of the chamber in both types of meter. In addition to its function in providing pressure between the surfaces at 14 and 26 to form a tight joint about the outlet-ports, the key 29 locks the chamber against rotation in the casing, and provides a flexible connection between these parts which may yield in event of there being impressed upon the casing such strains as come from misalinement of the piping-connections, or which are sometimes set up in testing machines. This latter feature guards the measuring chamber against breakage.

From the disk 11 the customary spindle 35 acts upon a train of gearing 36, transmitting the movement of the disk or other motor device to a register 37. In both types of meter, the gearing 36 is carried upon a supporting frame secured in the dividing wall 38 of the casing by a threaded stud or projection 39. This frame, in Fig. 1, is shown as an open structure 40, through which flows the liquid to be measured; but in Fig. 2 it takes the form of a closed casing 41, removable from the outer casing with the contained gearing as a unit, and which, upon the removal of a head 42, may be filled with a suitable lubricating substance, as a light grease.

I claim:

1. In a meter, a measuring chamber for use in different types of outer casings provided with ports, said chamber having opposite heads and an intermediate peripheral wall in which is a port for co-operation with the casing ports, the chamber being arranged to enter different types of casings with its respective heads in advance and to form a fluid-tight joint between its port and the co-operating outer port.

2. A meter comprising an outer casing provided with inlet and outlet-ports, an inner chamber having a port to register with one of those in the casing, and a member situated between the casing and chamber and arranged both to force the ports of the inner and outer casings into co-operation and to lock and positively retain the casings against relative rotation.

3. A meter comprising an outer casing, an inner chamber, said casing and chamber being provided with registering grooves, and a spring-key lying within the grooves of the casing and chamber.

4. A meter comprising an outer casing, an inner chamber, said casing and chamber being provided with registering grooves and there being depressions at the opposite extremities of one of the grooves, and a spring-key lying within the grooves of the casing and chamber and having at one extremity an angular portion arranged to enter one of the depressions.

5. A meter comprising an outer casing having a generally cylindrical interior from the peripheral wall of which are inward projections, there being inlet and outlet-ports to the casing with one of said ports formed in a projection, a generally cylindrical inner chamber spaced from the casing and provided with peripheral projections co-operating with those of said casing, one of which projections contains a port registering with the port-projection of the outer casing, there being opposite grooves in the adjacent walls of the casing and chamber spaced peripherally from the projections, and a spring-key situated in the grooves.

Signed at Boston, in the county of Suffolk and State of Massachusetts, this second day of June, 1923.

JAMES A. TILDEN.